March 11, 1969 — J. L. STEWART — 3,432,618
METHOD AND SYSTEM OF ANALYZING THE INNER EAR
Filed July 12, 1965

INVENTOR.
JOHN L. STEWART
BY Meyers & Peterson
ATTORNEYS

# United States Patent Office 3,432,618
Patented Mar. 11, 1969

3,432,618
METHOD AND SYSTEM OF ANALYZING THE INNER EAR
John L. Stewart, Menlo Park, Calif., assignor to Santa Rita Technology, Inc., Menlo Park, Calif., a corporation of Arizona
Filed July 12, 1965, Ser. No. 471,074
U.S. Cl. 179—1                                5 Claims
Int. Cl. H04m 1/00

---

ABSTRACT OF THE DISCLOSURE

An electrical impedance network that modifies electric signals applied to it in a manner analogous to the modification of audio signals applied to the inner ear of a mammal by the middle ear. The network is constituted by a plurality of passive elements so proportioned with respect to one another that various points in the network correspond with great accuracy to the neutral location on the cochlea. A physical model is hydrodynamically analyzed as a step intermediate the animal ear and the electrical network simulating the ear. Included in the network are non-linear elements that simulate cochlear non-linearities of the type exploited by bats, porpoises, and the like in practicing echolocation.

---

This invention relates generally to a method and system for analyzing the functioning of an animal ear, and pertains more particularly to an electric analog model that characterizes or simulates the mamallian inner ear.

As is generally known, the purpose of the inner ear is to transform incoming sonic (or ultrasonic as the case may be) vibrations in a way which facilitates analysis by the animal brain. Although several efforts have been made in the past to build an accurate model for the inner ear of an animal, these attempts have generally overlooked central factors related to the hydrodynamic impedance transformation. Actually, I have participated in one of the prior efforts alluded to above, this particular development being described in a patent application filed by William F. Caldwell, Ewald Glaesser and myself on Dec. 19, 1962, Ser. No. 245,697 for "Electronic Analog Ear," now Patent No. 3,294,909. The present system in no way invalidates the above-mentioned invention, but is an improvement thereover as far as the study of the inner ear is concerned.

As a preface to describing the instant invention, it can be explained that a certain type of non-linearity which I can place in the structure affects waveform envelope analysis. This phenomenon is believed to be at the root of the human ability to perceive the fundamental pitch component in a human voice even though that component does not itself physically exist in the received sound. It is believed that this phenomenon, for instance, is of major importance to an animal, such as the insect-catching bat or a dolphin, as an essential part of its echolocation and target identification system.

Accordingly, it is an object of the present invention to provide an improved model of the inner ear. More specifically, the invention has for an aim the provision of an improved electrical analog network which models the inner ear.

A still further object is to provide an accurate electrical model of a linear vibrating structure to which a desired non-linearity may be affixed in the practicing of the invention.

Still another object is to provide a hydrodynamic system which facilitates and renders more accurate the derivation of the electrical analog network employed in the ultimate waveform analysis.

Yet another object of the invention is to provide an analog ear analyzing system that will be simple and sufficiently low in cost that its use will be encouraged in conjunction with equipment normally sold to small organizations and individuals. For example, it is envisaged that my simplified system can be embodied in sound level meters, audiometers, hearing aids and language instruction apparatus.

These and other objects and advantages of my invention will more fully appear from the following description, made in connection with the accompanying drawings, wherein like reference characters refer to the same or similar parts throughout the several views and in which.

Figure 3:
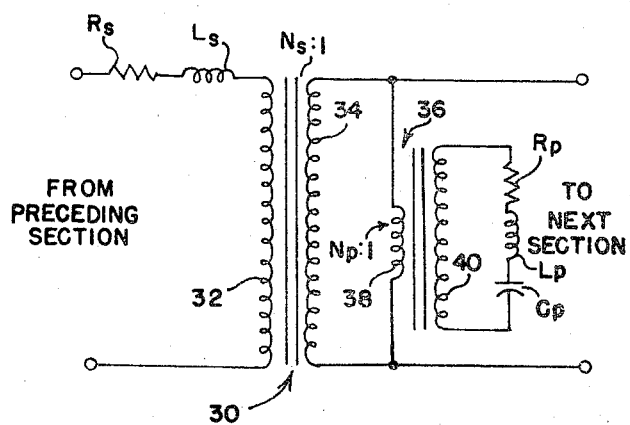
FIGURE 3 is an electrical diagram representing an incremental $\Delta x$ slice of the hydrodynamic structure depicted in FIGURE 1.
Figure 4:
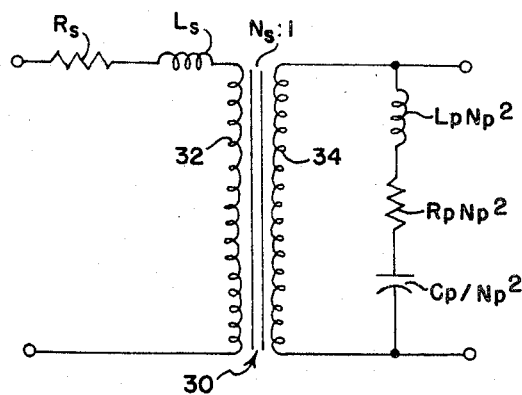
Figure 5:
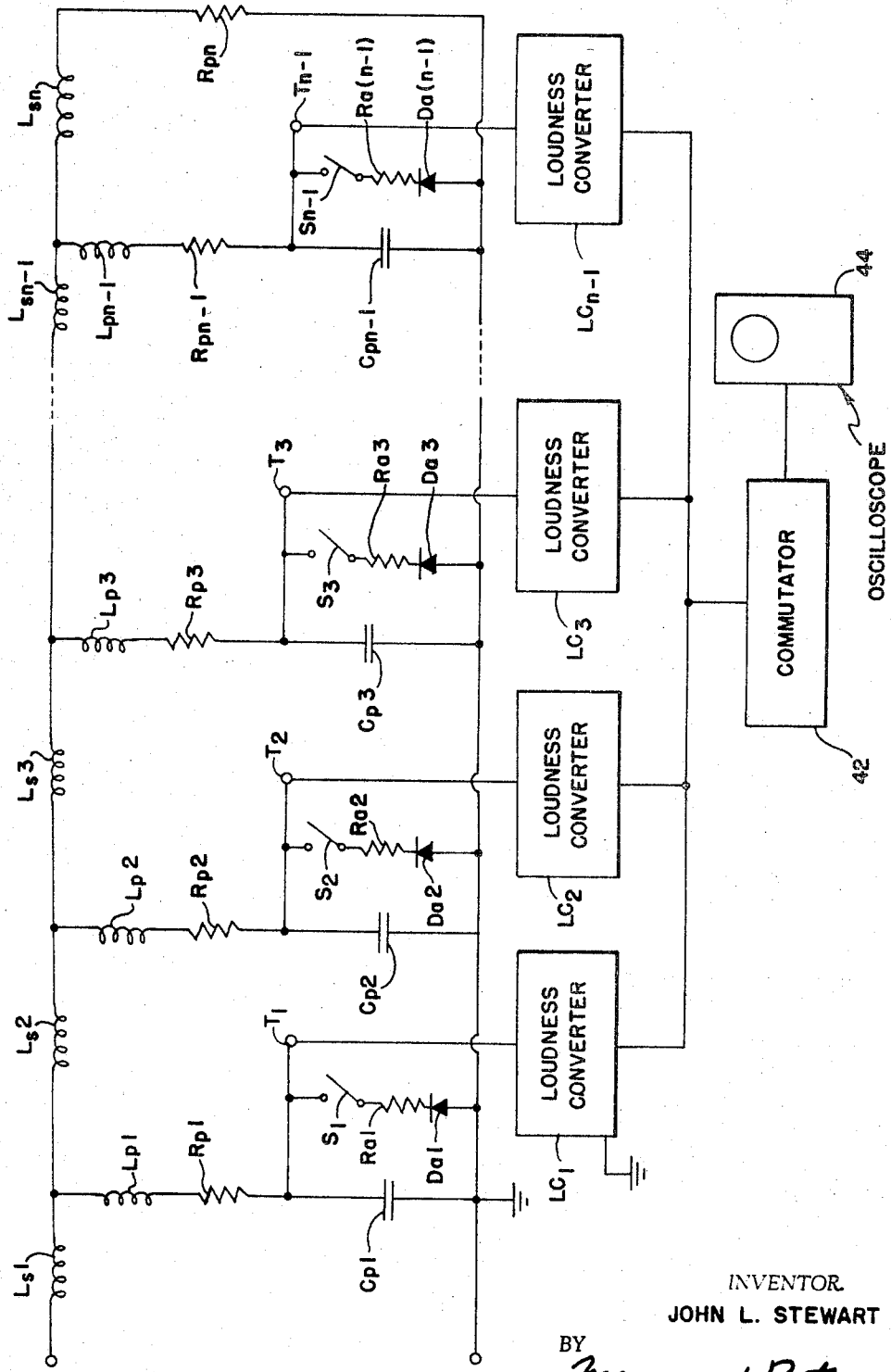

FIGURE 4 corresponds basically to the diagram constituting FIGURE 3 but it is a more simplified version thereof, and FIGURE 5 is a schematic diagram representing the entire hydrodynamic system on an electrical basis, being composed of a number of even more simplified circuit sections than the individual circuit section presented in FIGURE 4.

The animal ear is composed of the outer, middle and inner ear sections which can be characterized in the manner described in the above-alluded-to patent application. The present invention, however, is chiefly concerned with a filter representation of just the inner ear. Briefly, the invention contemplates a two-step approach. First, a hydrodynamic model or structure of the animal ear is devised having physical characteristics similar to the cochlea of the particular species of ear to be studied. This model, while it has the same physical dimensions, generally speaking, of the ear, can be manipulated or mathematically modified as circumstances dictate to derive greater accuracy or to introduce intentionally some variable that is to be evaluated in the study program being pursued. The hydrodynamic structure or model is then used in the development of an electrical circuit network providing an analog related to the hydrodynamic structure.

Figure 1:
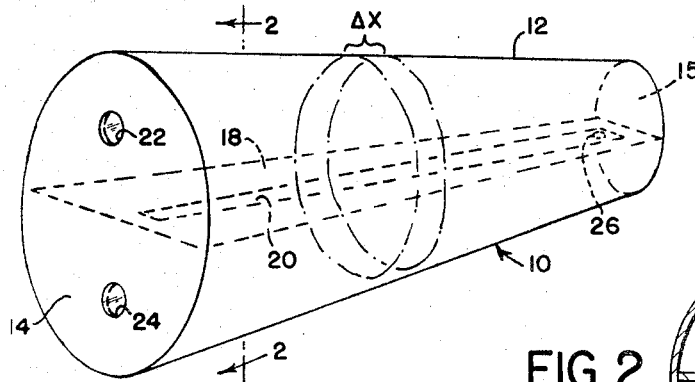
FIGURE 1 is a perspective view of a hydrodynamic structure utilized in the practicing of the invention.
Figure 2:
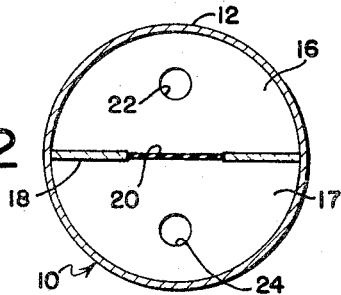
FIGURE 2 is a sectional view taken in the direction of line 2—2 of FIGURE 1.

Although the present invention is not limited to simulating the human ear, the dimensions of the hydrodynamic structure generally designated by the reference numeral 10 in FIGURES 1 and 2 generally conform to the dimensions of the cochlea of the human ear. The hydrodynamic structure or model 10 comprises a rigid tube 12 about 36 millimeters long having end walls 14, 15. The cross sectional area of the tube 12 at the end wall 14 is 1.6 square millimeters and decreases to 0.4 square millimeter at the apex or end wall 15. The tube 12 is divided into two chambers 16, 17 by a fixed partition plate 18 having a longitudinal slot therein over which is stretched a membrane 20. Close inspection of FIGURE 1 will reveal that the membrane is not of uniform width, instead increasing from a width of from 0.1 millimeter at the end thereof nearer the end wall 14 to a width of 0.5 millimeter nearer the end wall 15.

An input port or window 22 is provided in the wall 14 of the tube 12, such window leading into the chamber 16 and being covered with a flexible diaphragm so as to prevent the escape of fluid from the chamber 16, yet provide entrance for the sound vibrations that are to be studied. A similar port or window 24, also flexibly covered, serves in a relief capacity. Still further, the membrane 20 has a relief aperture at 26 which is adjacent its larger end and therefore nearer the end wall 15.

Thus, it will be appreciated that the membrane 20 serves to identify the two chambers 16, 17 and that these two chambers form two channels via which vibrations can propagate. In this regard, the membrane 20 possesses the property of elasticity, mass and damping, the aperture 26 providing relief for static pressure difference thereacross. For certain vibration frequencies applied at the input window 22, a localized region transverse vibrations will occur along the length of the membrane 20. Changing the frequency of excitation at the window 22 will cause the region of transverse vibrations to move, provided that the system parameters are properly chosen. The hydrodynamic system thus provides a waveform analysis mechanism which, in a sense, effects a frequency-to-position transformation.

Investigation of a small section $\Delta x$ of the tube 12 will assist in developing the analog for the hydrodynamic system of vibrations. Because of the taper imparted to the structure 10, the fluid flow necks down slightly in traversing the $\Delta x$ distance. This can be represented electrically with an ideal transformer, as will be described below. Further, fluid flowing in the transverse direction which causes membrane displacement also necks down depending upon the relative width of the membrane 20 at this locus, and this also can be represented by an ideal transformer.

The direct analog circuit for the $\Delta x$ slice shown in FIGURE 1 based on voltage-pressure and current-velocity comparisons is schematically portrayed in FIGURE 3. In this electrical equivalent, the inductance $L_s$ represents the inertia effects of fluid moving along the membrane 20 and $R_s$ represents the damping of this motion. Elements $R_p$, $L_p$ and $C_p$ represent damping, inertia and elasticity of the membrane 20 and fluid moving with it relative to transverse vibratory motion. The transformation ratio $N_s$ of the transformer 30 composed of the primary winding 32 and the secondary winding 34 is a number slightly larger than unity and equal to the ratio of total cross sectional area at the beginning of the $\Delta x$ slice relative to that at the end of the exemplary slice. Therefore:

$$N_s = A(x+\Delta x)/A(x)$$

The ratio $N_p$ of the transformer 36 composed of the primary winding 38 and the secondary winding 40 is approximately equal to the ratio of total width of the tube 12 relative to the width of the membrane 20, and this ratio decreases toward the apex or end wall 15 where the membrane width is maximum. The impedance comprised of $L_p$, $C_p$ and $R_p$ can be referred to the primary winding 38 and therefore the transformer 36 need not be retained in the analog represented by FIGURE 3. Instead, the circuit can be simplified to that depicted in FIGURE 4.

The entire frusto-conical structure 10 can be considered as being made up of many $\Delta x$ slices or increments with the output of the first incremental slice acting as the input to the following slice and so on throughout the entire length of the tube 12. Therefore, an electrical equivalent of a number of the circuits of the type shown in FIGURE 3 or FIGURE 4 can be used when connected in cascade to represent the entire structure 10. The number of circuit sections employed will determine the fineness or resolution of the analog representation.

When the network is viewed as a whole, it is seen that all of the circuit elements may be referred around the many cascaded transformers to one end of the structure 10 so as to eliminate all transformers in the final equivalent circuit. Actually, circuit elements near the final point of referral transform through only a few transformers 30, thus being subjected to a relatively small impedance change, but those elements near the other end of the structure 10 accumulate a total impedance transformation which is relatively large.

It suffices to determine only the relative values of the analog inductors in order to develop the ultimate analog; the values of these elements are found from the results of physiological experiments. Using the voltage-pressure and current-velocity comparisons hereinbefore alluded to, the series coils $L_s$ decrease by about 4:1 (according to the cross sectional area of the tube 12) and the values $L_p$ decrease by about 5:1 (according to the width of the membrane 20). After eliminating all transformers 30 and 36 through referral, using the transformer turns ratios $N_s$ and $N_p$ as cited before, the equivalent circuit has $L_s$ values that increase and $L_p$ values that also increase from the input end which is adjacent the end wall 14 in the direction of the apex or end wall 15 of the tube 12, and the $L_p$ values are larger than corresponding $L_s$ values. Limited accuracy and variability associated with the knowledge of the hydrodynamic structure 10 permit the final inductance values to be specified in terms of simple approximating formulas.

To compute the aforementioned terms on an approximate basis, let N be the number of analog approximating circuit sections corresponding to the section shown in FIGURE 3 or 4, although simplified thereover as explained above and L be the total length of the tube 12. Let $\alpha$ and $\beta$ be indices which, for the human ear analog, are each unity. The factor H is an impedance scaling factor which can be adjusted to meet practical needs. Then the $k$th section inductance values are $$L_{sk} = H\left[1 + \frac{5\alpha(k-1)}{N-1}\right]$$

$$L_{pk} = 5\beta L_{sk}$$

The resulting simplified network is diagrammed in FIGURE 5, although certain circuit components have been superimposed thereon to illustrate the versatility of my system as far as introducing non-linear aspects thereto and which added components will be explained more fully hereinafter. It will be noted, though, from the relatively simple circuit of FIGURE 5 that the $n$th shunt section is a simple resistor labelled $R_{pn}$ (although in some cases it will be a short circuit) which is consistent with the apical end pressure relief aperture 26 previously mentioned. It will be appreciated that with different $\alpha$ and $\beta$ indices, various hydrodynamic configurations of the model or structure 10 may be represented, such as for a different animal ear.

If one is concerned with wave propagation through the series inductors $L_s$, the analog structure is like an $m$-derived delay line except that it is tapered in impedance level and has lossy shunt networks. The ideal lossless $m$-derived network has an $m$ value as below:

$$m = 1/\sqrt{1+5\beta}$$

(where $\beta$ is unity for the human ear)

The characteristic impedance in the above-mentioned ideal lossless $m$-derived network is:

$$R_o = \sqrt{L_{pk}/C_{pk}}$$

The cut-off frequency for wave propagation and frequency for infinite attenuation are:

$$\omega_c = 2\pi f_c = 2/\sqrt{L_{sk}C_{pk}}$$

$$\omega_\infty = 2\pi f_\infty = 1/\sqrt{L_{pk}C_{pk}}$$

In this invention, the desired output is in the form of a voltage appearing between the various terminals $T_1$, $T_2$, $T_3$, $T_{N-1}$ and ground in FIGURE 5. These voltages differ from those to ground between series inductors $L_s$, that is, $L_{s1}$, $L_{s2}$, $L_{s3}$, $L_{sN-1}$, according to the resonance characteristics of the serially connected groups of elements identified as $R_p$, $L_p$ and $C_p$. The values for the capacitors $C_p$ are obtained by causing each to resonate with its associated inductance $L_p$ at the desired frequency. In realizing a representation of the human ear, the frequencies are determined as points on a straight line plotted on log graph paper with one extreme point, this being for the capacitor $C_{p1}$, being at 16,500 cycles per second and the other extreme point, this being for the capacitor $C_{pN-1}$, being at 45 cycles per second.

With the values of the inductors and capacitors determined as outlined above, the values for the resistors $R_{pk}$ are set by direct experiment analogous to that used in studying actual preparations taken from human cadavers. The input signal to the network illustrated in FIGURE 5 is in the form of a narrow current pulse which is at least several times narrower than the period of the frequency which describes the particular shunt branch resonant circuit under consideration, as indicated by the voltage appearing at the terminal $T_1$, $T_2$ and $T_3$ or $T_{N-1}$ associated with said particular branch circuit. Each such narrow input pulse produces a damped sinusoidal voltage across the particular capacitor $C_{p1}$, $C_{p2}$, $C_{p3}$ or $C_{pN-1}$ undergoing test. The associated resistor $R_{p1}$, $R_{p2}$, $R_{p3}$ or $R_{pN-1}$, as the case may be, is set to give sufficient damping to the sinusoid so that successive sinusoidal peaks in the same direction have a magnitude ratio of approximately 5 to 1. Such a setting corresponds, approximately, to a circuit Q value of two where:

$$Q = \omega_o L_{pk}/R_{pk}$$

Whereas the various resistors $R_p$ in the different branches shown in FIGURE 5 have been serially arranged in each branch, appropriate resistors may be placed in parallel with their associated capacitors $C_p$ instead of in series therewith, or suitable resistors may be inserted in both places, assuming, quite obviously, that the proper ohmic value or values would be determined by the procedure outlined hereinbefore.

The outputs from the various circuit sections energize apparatus now to be referred to only briefly, the output voltages constituting a collection of $N-1$ voltages which appear across the capacitors $C_p$. Actually, the terminals $T_1$, $T_2$, $T_3$ and $T_{N-1}$ of the analog network allow the outputs across said capacitors to be fed to a bank of loudness converters $LC_1$, $LC_2$, $LC_3$, $LC_{N-1}$ in the illustrated situation, such loudness converters being more fully described in the application identified earlier herein. More precisely, at the $k$th point, it is the voltage $h_k e_{pk}$ rather than $e_{pk}$ itself which is of interest, where $h_k$ is a gain constant which depends upon the section number $k$. The proper value of $h_k$ can be determined in order that $h_k e_{pk}$ represents the transverse displacement of the long membrane 20 of the hydrodynamic structure 10 at the corresponding position. To represent displacements, it is easier to adjust the $h_k$ constants to conform with actual measurements observed on preparations taken from cadavers. Proper adjustment is achieved approximately as follows: A sine wave of relatively low frequency, below the lowest resonant frequency in the structure, is applied to the input side of the network. The value of $h_k$ of the apical section, $h_{N-1}$ is set at a maximum. All the other $h_k$ values are adjusted so that the pattern of voltages rises linearly from the input end. That is, $h_{N-1}e_{N-1}=N-1$ volts (or some constant fraction thereof) as measured with a voltmeter, then $h_{N-2}e_{N-3}=N-2$, $h_{N-3}e_{N-3}=N-3$ and so forth, to $h_3 e_3 = 3$, $h_2 e_2 = 2$, and $h_1 e_1 = 1$. This adjustment is hardly critical, a variety of possibilities being apparent. The scale factors have frequently been set to a maximum for the apical 10–20 percent of the structure, reducing appropriately over the remainder. The scale factor adjustments can in any event be readjusted using various input sine wave frequencies to yield cadaver-observed characteristics. If the voltages $h_k e_{pk}$ are to represent neural activity in the animal cochlea instead of membrane displacement, somewhat different values may be appropriate; then, displacement and neural activity may not be entirely proportional.

The outputs from the loudness converters LC are fed to a commutator 42, also more fully described in said copending application, which in turn is connected to an oscilloscope 44. More will be said hereinafter concerning the roles played by these two instruments.

The design and adjustment of the linear analog corresponding to the hydrodynamic structure 10 is now complete, a table of element values, keyed to FIGURE 5, being presented at the end of the descriptive portion of the specification and just before the claims, which values are used to build the network illustrated in FIGURE 5. Potentiometers may be employed for the $R_{pk}$ elements for ease of adjustment, although fixed values would be suitable. Coils are of the pot core type using a suitable ferrite material, although a variety of coil types are usable, it being understood that the parallel inductors $L_p$ need not have appreciable Q values. The values for $h_k$ are set with potentiometers (not shown) in an obvious way, it being necessary, however, to avoid excessive loading of the circuit by the potentiometer.

It is an important object of the invention to introduce a non-linear augmentation, namely, that which implements waveform envelope demodulation. More specifically, a resistor $R_a$ and a germanium diode $D_a$ in series with each other are placed across each of the capacitors $C_{p1}$, $C_{p2}$, $C_{p3}$, $C_{pN-1}$, respectively; these various resistor-diode combinations may actually be connected across the capacitors through the agency of a number of switches $S_1$, $S_2$, $S_3$ and $S_{N-1}$ so as to compare circuit response with and without these nonlinearities. In this way, a modulated waveform will be to some extent demodulated. More precisely and for a simplified signal, if a sine wave waxes and wanes at some periodic frequency lower than itself but still within the range of frequencies to which the shunt arms or branches of the network structure resonate, then this low frequency will be physically present across the particular capacitor $C_{pk}$ by virtue of the diode action, even though it is not present in the absence of the diode. This physical wave, which is induced in regions of the network appropriate to frequencies higher than itself, will propagate along the network and create activity toward the end corresponding to the apical end of the structure 10 in the same fashion as if it had existed in the incoming wave. Also, some small harmonic components of the varying sine wave will be introduced. It is believed that this is the basic mechanism by which the animal can analyze envelope variations, such as human perception of the fundamental voicing component in speech or decision as to whether a sound was voiced, unvoiced or lacking a low frequency envelope fluctuation. It is further believed this mechanism aids in echolocating animals such as the bat in effecting target identification. It is pointed out with special reference to the bat that its emission, and hence returned echo, may not have direct components below 30 kilocycles, and its inner ear analyzes best at lower frequencies with a most sensitive region around 10 kilocycles. The echo ultrasonic sound has an envelope which bears useful data to the bat, and after demodulation, the envelope components may be analyzed using the most effective regions of its inner ear.

Another thing observed to result from cochlear non-linearities is a form of envelope rate of change detection. A sudden change in the intensity of a complex sound is demodulated by non-linearities to a step function. This step wave propagates to the furthest end of the cochlea where it produces a transient deflection. Approximately, the activity at the apical end seems to represent the magnitude of the time derivative of the envelope of basilar membrane motion. Even in the presence of considerable interference, this behavior persists so that envelope changes such as occur in connection with vowel-consonant transitions are preserved.

The above is an important discovery in that it explains a frequency translation and synthesis mechanism as well as an envelope rate of change detection mechanism present in nature which has not been embodied in any previous linear model of the ear. What are called cochlear nonlinearities are required in order to realize this phenomenon.

As indicated above, suitable resistors $R_{ak}$ and diodes $D_{ak}$ are employed and may be individually and selectively connected into the circuitry by means of the switch S. A typical set of resistive values is denoted by the column labelled $R_{ak}$ in the table at the end of the specification and which table has already been briefly referred to. The resistor $R_{ak}$ in each case is adjusted to reduce the Q of the resonant circuit by about 20 percent at the average desired output voltage level, although this figure is not critical and can be varied along the network structure, perhaps even being absent toward the apical end thereof. For proper operation, the operating voltage level must be large enough for proper diode action. The diode representation models resistance to the transverse motion of the membrane 20 which is greater in one direction than in the other. Although this phenomenon has not yet been observed in the animal preparation, it is believed to exist and is due to some electromechanical reaction of cellular dimensions due, perhaps, to the inducing of neural firings by the hair cells of the inner ear. In this regard, it has long been observed that short sound pressure pulses with air pressure in one direction are considerably louder to a human observer than they are in the other, which suggests a non-linear neural reaction.

Earlier reference was made herein to the loudness converters LC and the commutator 42 and the oscilloscope 44 associated therewith. Such equipment constitutes but one simple means by which the parameter of displacement of the membrane 20 can be converted to a visualizable form; more sophisticated apparatus can be resorted to. Describing the simplified way, each voltage $h_k e_{pk}$ is rectified and filtered by the appropriate loudness converter LC so that the result is a short-time average measure of the magnitude $h_k e_{pk}$. These results are what an ordinary average-sensing alternating current voltmeter reads. Each loudness converter detector contains a post-detection filter which has a low-pass bandwidth of approximately 25 cycles per second so that pulsations in the voltage $h_k e_{pk}$ above 25 cycles per second are not sensed but below this frequency they are sensed as a vibrato—a similar thing in vision being called flicker fusion. The loudness converter or low-pass filter must have a sharp cut-off so that the envelope fluctuations occurring at the voice fundamental frequency are not retained; this is achieved with multi-section filtering. The rectifier itself is sensitive to a broad range of input frequencies but the response falls off below, roughly, 300 cycles per second in emulation of a neural phenomenon in hearing called the volley effect; a rectifier generally uses a coupling capacitor or transformer which provides this low frequency behavior. The result of detecting and filtering is a set of $N-1$ monopolar and relatively slowly varying voltages which follow the various envelope characteristics of normal speech and which can be examined and displayed in various ways, such as by using the commutator 42 and the oscilloscope 44 in FIGURE 5 which coact to give a visual space-time pattern.

Up to this point, it has not been explained how the network of FIGURE 5 is excited. The network must be driven from a voltage source through a path or network which represents the filtering behavior of outer and middle parts of the ear. This filter is adjusted to give an over-all neural activity measure that is consistent with the well-known human auditory curve of threshold. The over-all neural response measure is the sum of the $N-1$ detected and filtered outputs from the loudness converters LC which summation can be effected with a simple passive array of $N-1$ resistors (not shown).The transfer function which equates to the auditory threshold curve is the ratio of this summed voltage to the RMS input sine wave intensity as a function of frequency. This filtering task, when performed on an adequate approximation basis, is directly and simply achieved once the voltage sum has been acquired; it is not felt necessary to go into a detailed discussion.

It will, of course, be understood that various changes may be made in the form, details, arrangements and proportions of the parts without departing from the scope of my invention as set forth in the appended claims.

The hereinbefore mentioned table appears below.

TABLE OF VALUES FOR FIGURE 5

| k | $L_{sk}$, mh. | $L_{pk}$, mh. | $R_{pk}$ pot., kΩ | $C_{pk}$, pf. and μf. | $R_{nk}$, kΩ |
|---|---|---|---|---|---|
| 1 | 17.5 | 175 | 25 | 460 pf | 36 kΩ |
| 2 | 40 | 200 | 25 | 560 pf | 36 kΩ |
| 3 | 45 | 225 | 25 | 720 pf | 36 kΩ |
| 4 | 50 | 250 | 25 | 950 pf | 33 kΩ |
| 5 | 55 | 275 | 25 | 1,180 pf | 30 kΩ |
| 6 | 60 | 300 | 25 | 1,440 pf | 27 kΩ |
| 7 | 65 | 325 | 25 | 1,910 pf | 27 kΩ |
| 8 | 70 | 350 | 25 | 2,430 pf | 22 kΩ |
| 9 | 75 | 375 | 25 | 3,290 pf | 20 kΩ |
| 10 | 80 | 400 | 25 | 4,330 pf | 18 kΩ |
| 11 | 85 | 425 | 10 | 5,600 pf | 18 kΩ |
| 12 | 90 | 450 | 10 | 7,460 pf | 16 kΩ |
| 13 | 95 | 475 | 10 | 9,700 pf | 12 kΩ |
| 14 | 100 | 500 | 10 | 12,500 pf | 10 kΩ |
| 15 | 105 | 525 | 10 | 17,300 pf | 10 kΩ |
| 16 | 110 | 550 | 10 | 23,800 pf | 10 kΩ |
| 17 | 115 | 575 | 10 | 31,800 pf | 9.1 kΩ |
| 18 | 120 | 600 | 10 | 42,500 pf | 7.5 kΩ |
| 19 | 125 | 625 | 5 | 56,100 pf | 7.5 kΩ |
| 20 | 130 | 650 | 5 | 76,400 pf | 6.8 kΩ |
| 21 | 135 | 675 | 5 | 0.106 μf | 5.6 kΩ |
| 22 | 140 | 700 | 5 | .143 μf | 4.3 kΩ |
| 23 | 145 | 725 | 5 | .196 μf | 3.6 kΩ |
| 24 | 150 | 750 | 5 | .263 μf | 2.2 kΩ |
| 25 | 155 | 775 | 2 | .358 μf | 820 Ω |
| 26 | 160 | 800 | 2 | .507 μf | 560 Ω |
| 27 | 165 | 825 | 2 | .722 μf | 510 Ω |
| 28 | 170 | 850 | 2 | .957 μf | 300 Ω |
| 29 | 175 | 875 | 2 | 1.27 μf | 300 Ω |
| 30 | 180 | 900 | 2 | 1.72 μf | 300 Ω |
| 31 | 185 | 925 | 2 | 2.06 μf | 300 Ω |
| 32 | 190 | 950 | 1 | 3.33 μf | 300 Ω |
| 33 | 195 | 975 | 1 | 4.06 μf | 300 Ω |
| 34 | 200 | 1,000 | 1 | 6.1 μf | 300 Ω |
| 35 | 205 | 1,025 | 1 | 8.34 μf | 300 Ω |
| 36 | 210 | 1,050 | 1 | 12 μf | 300 Ω |
| 37 | 107.5 | | | | |

I claim:

1. A non-linear network system representative of an animal ear comprising N elemental circuits interconnected in cascade configuration, each said elemental circuit including a series branch comprised of a first inductor connected in series with the inductor of the next elemental circuit and a shunt branch comprised of a series combination of a second inductor, a resistor and a capacitor, said first inductor having an inductance $L_{sk}$ henries equal to $$H\left[1+\frac{5\alpha(k-1)}{N-1}\right]$$

in which H is an impedance scaling factor, $\alpha$ is an index factor that has a magnitude which corresponds to a particular animal species, N is a positive integer, and $k$ is a positive integer less than N, representing the particular one of said cascaded elemental circuits numbered consecutively from the input of said network system.

2. A non-linear network system in accordance with claim 1 wherein said second inductor has an inductance $L_{pk}$ henries equal to $$5\beta L_{sk}$$

in which $\beta$ is an index factor that has a magnitude which corresponds to a particular animal species.

3. A non-linear network system in accordance with claim 1 wherein $N=36$ and wherein the resistance of said resistor equals approximately 25,000 ohms where $k=1$ through 10; 10,000 ohms where $k=11$ through 18; 5,000 ohms where $k=19$ through 24; 2,000 ohms where $k=25$ through 31; and 1,000 ohms where $k=32$ through 35.

4. A non-linear network system representative of an animal ear comprising N elemental circuits interconnected in cascade configuration, each said elemental circuit including a series branch comprised of a first inductor connected in series with the inductor of the next elemental circuit, and a shunt branch comprised of a series combination of a second inductor, a first resistor and a capacitor, and a series combination of a diode and a second resistor connected in parallel with said capacitor, last said series combination introducing non-linearity into the system to simulate cochlear non-linearities, where N is a positive integer.

5. A non-linear network system in accordance with claim 4 in which the resistance of each of said second resistors is as follows for $k=1$ through 35, respectively:

36$k\Omega$, 36$k\Omega$, 36$k\Omega$, 33$k\Omega$, 30$k\Omega$, 27$k\Omega$, 27$k\Omega$, 22$k\Omega$, 20$k\Omega$, 18$k\Omega$, 18$k\Omega$, 16$k\Omega$, 12$k\Omega$, 10$k\Omega$, 10$k\Omega$, 10$k\Omega$, 9.1$k\Omega$, 7.5$k\Omega$, 6.8$k\Omega$, 5.6$k\Omega$, 4.3$k\Omega$, 3.6$k\Omega$, 2.2$k\Omega$, 820$\Omega$, 560$\Omega$, 510$\Omega$, 300$\Omega$, 300$\Omega$, 300$\Omega$, 300$\Omega$, 300$\Omega$, 300$\Omega$, 300$\Omega$, 300$\Omega$, 300$\Omega$ where $k$ equals a positive integer, less than $N$, representing the particular one of said cascaded elemental circuits numbered consecutively from the input of said network system.

References Cited

UNITED STATES PATENTS 3,113,187  12/1963  Flanagan.
3,294,909  12/1966  Caldwell et al.
3,325,597   6/1967  Stewart.

KATHLEEN H. CLAFFY, *Primary Examiner.*

R. P. TAYLOR, *Assistant Examiner.*